Aug. 17, 1954

F. C. MATHIEU 2,686,894

MOTOR OPERATED SELECTIVE CONTROL
FOR ACCURATE DISPLACEMENT

Filed May 24, 1951

Inventor:
Frédéric César Mathieu
By: Michael S. Striker
Agt

Fig. 3

Patented Aug. 17, 1954

2,686,894

UNITED STATES PATENT OFFICE 2,686,894

MOTOR OPERATED SELECTIVE CONTROL FOR ACCURATE DISPLACEMENT

Frédéric César Mathieu, Paris, France, assignor to Compagnie Radio Cinema, a corporation of France Application May 24, 1951, Serial No. 228,102

Claims priority, application France May 25, 1950

14 Claims. (Cl. 318—277)

In some apparatus or machines, it may be necessary to cause the displacement of a movable element which may, for example, be fitted on a sliding bar, and which must stop at some exactly determined position, and start the action of other elements at each of these stopping points. Moreover it may be necessary that this control be selective. For example, the action produced should be more or less intense in the various stopping points, or still more it should be performed by different elements.

Such devices are used in spectrographs intended to successively analyse certain lines chosen in a spectrum. A movable element carrying a photoelectric cell and provided with an exploring slot has to move along that spectrum, the cell being connected to the input of an amplifier whose output is connected to a measuring apparatus. The movable element stops at certain precise positions so that the slot, which may be quite narrow, permits only the radiations of the determined line whose intenstiy is to be measured, pass and go towards the cell.

Moreover, assuming that the various lines present great differences of intensity from one to another, a device should then be provided which causes a variation of the amplifier sensitivity so as to adapt it for a broad range of measurements to be effected, that is, according to the stopping position of the movable element.

In the known apparatus, the successive stopping points are generally determined by the driving control itself, e. g., in relation with the rotation angle of a threaded rod, or of a pinion, which meshes with a rack. In such arrangements the control depends upon the accuracy with which the threads or the cogs of the gears have been cut, and besides, such mechanical links are susceptible to play which is difficult to avoid. It is apparent that it is impossible with such devices to obtain the accuracy necessary for the utilisation of spectrographs, particularly if it is proposed to effect a series of measures for the analysis of ores, specimens of alloys, and other similar materials.

The object of the present invention is to eliminate these drawbacks.

According to a first characteristic of the invention, a movable element such as a carriage cooperates with first and second scale rules which are movable and parallel to its way; means for interlocking said movable element with said scale rules so as to carry them jointly; a sensitivity selector device being controlled by the position of the said interlocking means with regard to the first scale rule, whilst the displacement of the second scale rule acts upon a control device in end of course.

According to another characteristic of the invention, the interlocking means are constituted by two lugs which may respectively penetrate into notches provided in the first and the second scale rules, the depth of penetration into the notches of the first scale rule determining the position of the selecting device.

According to a further characteristic of the invention, the controlling device is actuated by the second scale rule in an extreme position thereof and is preferably constituted of an electric contact acting upon a vacuum tube electrode.

According to a further characteristic of the invention, the sensitivity selector device is constituted by a rotatable electro-conductive arm which comes into contact with one of a plurality of contact studs, said contact studs through the connections thereof controlling the input level to an amplifying circuit or any other convenient electrical control circuit.

According to yet another characteristic of the invention, the movable element is preferably driven by a mechanism involving two speeds, the second speed being greatly reduced with respect to the first one, and means being provided to pass from the first to the second speed when the interlocking means are in gear with the first scale rule.

The invention itself, however, both as to its construction and its method of operation, together with additional objects and advantages thereof, will be best understood from the following description of specific embodiments when read in connection with the accompanying drawings, in which.

Figure 1:
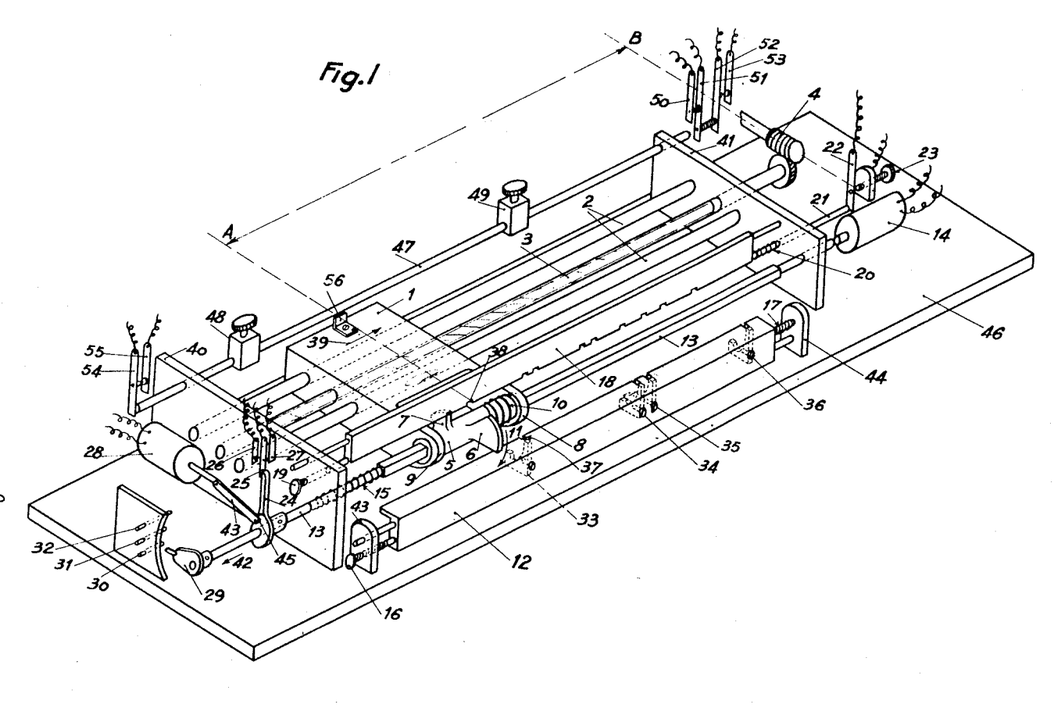
Figure 1 shows the ensemble of the device in perspective, during the course of the carriage.
Figure 2:
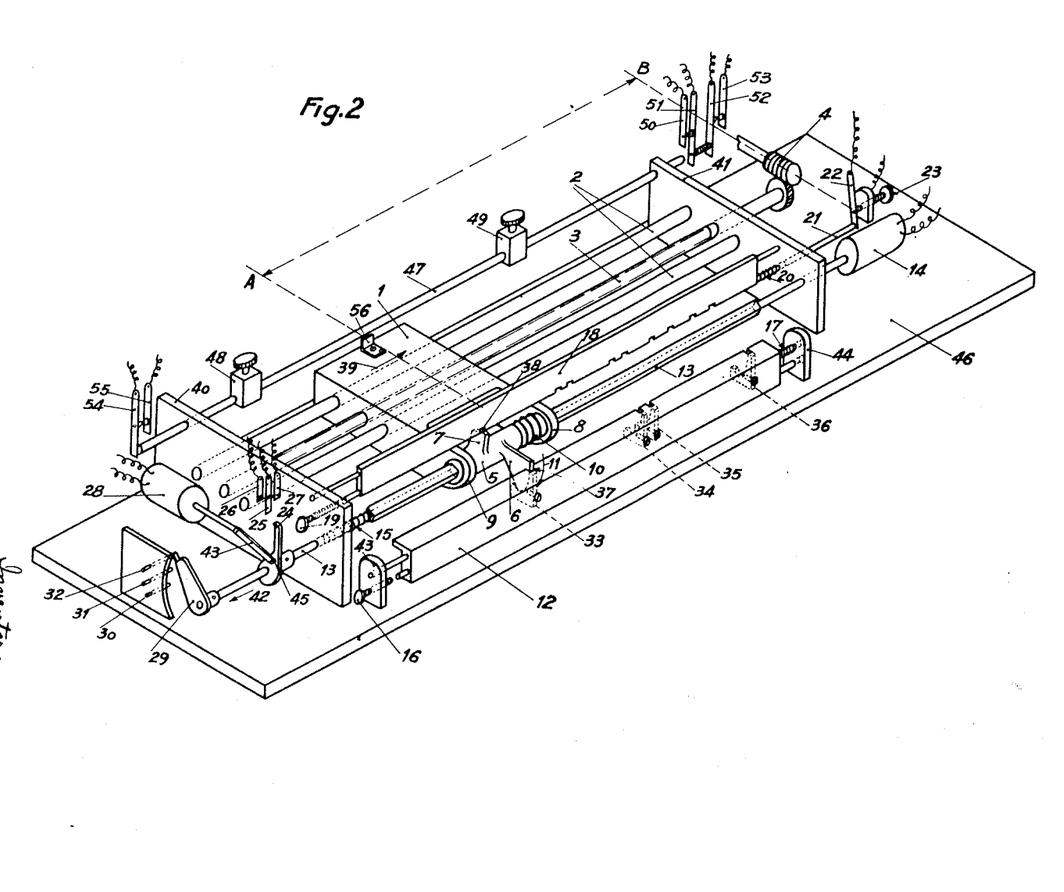
Figure 2 shows the same device when the carriage is at a stopping point.
Figure 3:
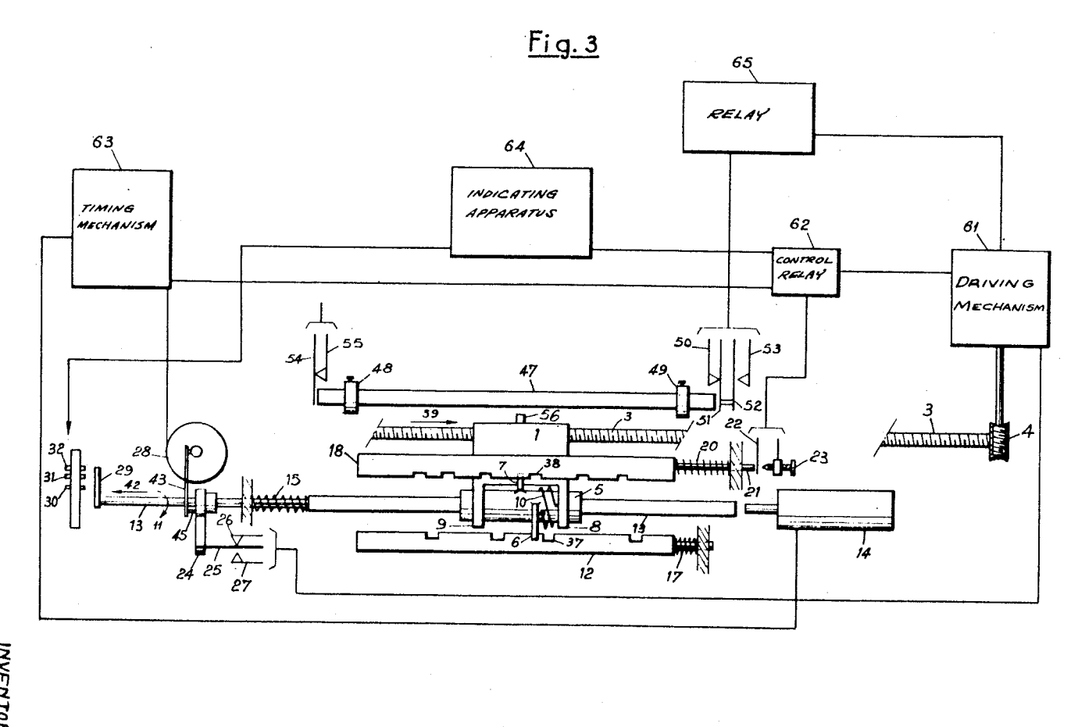
Figure 3 illustrates schematically the basic electric connections of an embodiment of the invention.

In these figures, the same reference numerals indicate the same structural elements.

Referring first to Figure 1, I indicates a carriage which may slide on two rods 2, its drive being effected by means of a threaded rod 3 which is rotated by means of worm gear 4 driven by a driving unit which includes a motor and a convenient gear box shown symbolically in Fig. 3 by the block 61.

The carriage 1 carries a photoelectric cell of suitable type situated behind a narrow slot perpendicular to the run way, that is, perpendicular to the direction of the rods 2 and the screw 3. An optical arrangement produces a spectrum of lines parallel to the same direction so that when the carriage is moved the slot explores the spectrum. The photoelectric cell is associated with indicating apparatus including an amplifier and suitable measuring apparatus and is diagrammatically illustrated in Fig. 3 by the block 64.

The carriage is moved to successive exact positions so that the slot admits the radiations of some definite lines, the intensity of which it is proposed to measure. The radiations of the lines then pass towards the cell.

Still referring to Figure 1, a bushing 5 is provided with two lugs 6 and 7 and is arranged between two bearings 8 and 9 which form part of the carriage 1. A helicoidal spring 10 tends to turn the bushing 5 in the direction indicated by the arrow 11.

Reference numerals 12 and 18 designate two rules which will respectively be called hereinafter as "analysis rule" and "feeler rule." In the analysis rule, a certain number of notches such as 37 are cut in which cleats of different heights such as 33, 34, 35 and 36 may be inserted. Notches such as 38 are cut in the feeler rule. During the displacement of the carriage, the spring 10 tends to turn the bushing 5 which moves the lug 6 so that it contacts the analysis rule 12.

The bushing 5 is provided with a square bore along its axis to permit the bushing to slide freely on the square sectioned shaft 13, which itself rotates in the end flanges 40 and 41, so that this shaft follows the angular motions of the bushing. In addition, the shaft can move longitudinally in the direction of the arrow 42, by the action of a convenient device such as an electromagnet with plunger core 14, and is normally brought back, in reverse direction of that arrow, by the spring 15. The analysis rule 12 can also slide longitudinally in the end lugs 43 and 44; it is pulled back towards 43 by a spring 17, the thrust being adjustable by means of a screw 16.

The feeler rule 18 may also be displaced longitudinally. The feeler rule is provided with end pegs sliding in the flanges 40 and 41. The feeler rule is pulled back toward the flange 40 by a spring 20 to contact the end of an adjustable screw 19. One of the pegs is prolonged by a rod 21 which passes through the flange 41 to push a flexible blade 22 of electro-conductive material into electric contact with the end of an adjustable screw 23.

An arm 24 is fixed to the shaft 13 and bears upon a flexible conducting blade 25. So long as the lug 6 bears upon the analysis rule 12, the blade 25 makes contact with another blade 26. However, if the lug 6 falls into a notch such as 37, the rotation of the bushing 5 in the direction of the arrow 11 causes the square sectioned shaft 13 to turn, in which case, the arm 24 ceases to bear upon blade 25 which then comes into contact with another flexible blade 27. It is therefore seen that when the lug 6 is sliding on the rule 12 or has fallen into a notch such as 37, an electric contact is made either between 25 and 26, or between 25 and 27, respectively.

A plunging core magnet 28 is joined to the shaft 13 by means of a small connecting-rod 43 hooked to a crank stud 45. When the magnet is energized, this mechanism produces a torque which causes the shaft 13 to turn, as well as the bushing 5, in a direction inverse to that of arrow 11 so that the lug 6, after falling into a notch, can be removed therefrom.

At the end of the shaft 13 is fixed a selecting arm 29, the extremity of which is arranged, in front of contact studs such as 30, 31 and 32, which of course, may be in any number whatever. When the lug 6 falls into a notch such as 37, the cleat 33 which has been placed in the notch determines the end of the angular motion of the bushing 5. Therefore the choice of the cleat 33 determines the contact stud before which the arm 29 will stop. When the latter assumes a predetermined position, and if the magnet 14 is energized, the shaft 13 is pushed in the direction of the arrow 42, so that the end of the arm 29 comes into contact with the chosen stud.

The operation of this device is as follows:

The optical arrangement, not shown, produces a spectrum of lines. If it has been decided to measure the intensity of some of the lines, four for example, the analysis rule 12 would be provided with four notches 37, as shown in the figures. The driving mechanism is then made operative whereupon the carriage 1 moves in the direction of the arrow 39. The lug 6 is caused to slide on the rule 12 until it meets a notch 37, into which it falls, and comes to rest on the bottom of the cleat 33. The lug 7 penetrates at the same time into the corresponding notch 38 of the feeler rule 18. The arm 24 is caused to turn backwards thereby breaking the electrical contact between blade 25 and blade 26, the blade 25 making contact instead with blade 27. The changing from one contact to the other, as noted, acts on the driving mechanism 61 to reduce its speed so that the carriage 1 proceeds along its path very slowly and drives the rules 12 and 18 which results in the compression of the springs 17 and 20 respectively. As a result, the rod 21 bears upon the blade 22 which makes contact with the end of the screw 23. This electrical contact, acting upon convenient circuits including a control relay 62, stops instantaneously the carriage 1. This abrupt stopping of the carriage is made possible by the reduction of its speed effected as set forth above. At the same time the magnet 14 is energized, for instance by a timing mechanism 63, and pushes the shaft 13 back in direction of the arrow 42, which results in the compression of the spring 15, the result being that the end of arm 29 comes into contact with a contact plug, 32 for example. The whole device is then in the resting position shown in Figure 2. The various controls which have just been enumerated can be easily embodied by means of electromagnetic relays as is well known in the art.

The contact studs such as 30, 31 and 32 are intended to adapt the amplifier sensitivity of the indicating apparatus 64 to the intensity of the successive lines. The gain is increased for the lines of poor brillancy and reduced for lines of great brillancy. For that purpose, any of numerous ways for effecting changes in sensitivity may be used. For example, these contact studs may be connected to various taps on an input resistor of an amplifying stage, or to various taps on a transformer primary. It would also be possible to replace these contacts studs by a resistor of circular shape, the end of the conducting arm 29 bearing upon different points according to the angular motions which are transferred to it by the rotation of the bushing 5. The arm 29 could also bear upon trigger mechanisms.

When the various elements are in the positions represented in Figure 2, the whole device remains stationary for a certain time, which may be determined for example by a timing mechanism 63, or any other similar device. During the stationary time of the device, the photoelectric cell carried by the carriage is impressed by the radiation from the spectrum line corresponding to the notch 37 into which the lug 6 has fallen. The measuring apparatus, included in the indicating apparatus 64, may be recording apparatus capable of producing a trace which deviates proportionally to the flow of light received by the cell. When the measurement is made, the timing mechanism 63 switches off the energizing circuit of the magnet 14 after which it energizes magnet 28. The square sectioned shaft 13, no longer being pushed back by the magnet 14, is forced back to its initial position by the spring 15 in which case the arm 29 ceases to bear upon the contact stud 32. The shaft 13 is then rotated by the small connecting rod 43 in a direction inverse to that illustrated by the arrow 11. At the same time, the rotation of shaft 13 causes the rotation of the bushing 5, whereupon the two lugs 6 and 7 disengage from their respective rules 12 and 18 which are caused to move backwards by the action of their antagonistic springs 17 and 20, respectively. The contact between the flexible blade 22 and the end of the screw 23 is then broken. The control relay 62 of the stopping magnet is deenergized, and starts again the driving mechanism 61 of the carriage at great speed when the contact between the contact springs 25 and 26 is made by the arm 24. The timing mechanism 63 also released by the relay 62 switches off the energizing circuit of the electromagnet 28 with the result that the lug 6 bears again upon the analysis rule 12, while the carriage moves at great speed in the direction of the arrow 39 until the lug 6 meets a notch 37. The various controls described above are then repeated.

It will be noticed that the stopping point of the carriage 1 does not depend in any way either upon the screw 3 or upon any other part of the driving mechanism. The stopping point depends upon the distance AB between the concerned notch of the rule 18 and the contact point between the contact spring 22 and the end of the screw 23. In order to avoid any sparking at that contact point it is designed to act upon the grid of a vacuum tube whose anodic current feeds a relay as above explained.

The rule 18 can be constructed according to known technics in order to eliminate the errors due to temperature variations. It may be constituted by two parts placed in juxtaposition and made of different metals so that the possible expansions of the base 46 will be compensated.

The feeling rule 18 is provided with notches 38 equal in number to the stopping points of the carriage 1, while the rule 12 is only provided with the number of notches 37 necessary for a given series of analysis. The rule 12, illustrated in the figures, is cut with four notches under the supposition that the intensity of four determined lines of a spectrum is to be measured. However, the notches 38 which do not correspond to these four notches 37 will not be availed of in the course of the intended analysis.

It will also be noticed that the only object of the rule 12 is to permit the lug 7 to penetrate some of the notches 38. For this reason the rule 12 can be constructed with less accuracy than the rule 18. To avoid unnecessary effort on the part of the operator, the unit may also include a device for automatically carrying the carriage back to its starting position when the exploration of the spectrum is finished. In the figures, 47 designates a rod which may slide in the flanges 40 and 41 and carries members 48 and 49 whose positions are adjustable. The carriage 1 is provided with a convenient projection 56, which depending upon the direction of travel of the carriage, contacts and pushes one or the other of members 48, 49. When carriage arrives at the end of its travel, in direction of the arrow 39, the rod 47 bears upon the electro-conductive elastic blades 51 and 52 joined together and associated with two other identical blades 50 and 53 respectively. The contact is then broken between 50 and 51 and made between 52 and 53. By the action of relay 65, the driving mechanism 61 stops and starts again in inverse direction. At the same time, the plunging core magnet 28 is energized, whereby the lug 6 remains raised during the return travel of the carriage 1, and so, cannot strike notches of the rule 12. The carriage on its way back to its departure point causes projection 56 to push the member 48, whereupon the rod 47 breaks the contact between the two conducting contact springs 54 and 55, which causes the driving mechanism to stop. The whole unit then remains stationary until the next cycle of operation which can be started by the operator by operating a convenient switch which causes the carriage to move once again in the direction of the arrow 39.

In the above description, it was assumed that the unit, according to the invention, was applied to a spectograph, and that the carriage 1 carried a photoelectric cell provided with an exploring slot. However, it is evident that the same device could be applied to other purposes. The controls in relation to lengths such as AB being designed with the utmost accuracy and the relay, controlled by the contact between the contact spring 22 and the screw 23, might for example act upon the elements of a machine tool or upon any control transmitter whatever, and generally speaking, upon any device which is to respond to an action in relation to which accurate and previously chosen displacements are desired.

The arrangement, represented on the figures, operates by means of contacts controlling relays and electric circuits. It is evident that, as the invention concerns a mechanical combination, it would be possible to use other means as well. The various elastic contact springs represented might be replaced, for example, by slide valve gears distributing a fluid under pressure, this fluid carrying out the same controls as above mentioned. The magnets 14 and 28 could also be replaced by cylinders in which a piston is subjected to the pressure of that fluid. The arms 29, instead of bearing upon conducting studs, could in turn act upon distribution valves or upon any trigger mechanism whatever.

Finally, the invention may also be applied to displacements different from rectilinear displacements. It can, indeed, be understood that it would be possible, for example, to give a certain curvature to the whole device represented in the figures. Instead of being rectilinear, the rules 12 and 18 could be shaped in the form of arcs. In this case the carriage would move along a path parallel to these arcs. It would also suffice to replace the square sectioned shaft 13 by an equivalent section having a certain flexibility.

What I claim is:

1. In an arrangement including a member movable along a predetermined path and a driving mechanism for moving said movable member along said predetermined path, means for terminating movement of said movable member at a predetermined point of said path comprising, in combination, an operating member arranged alongside the path of the movable member movable in direction of the same between inoperative and operative position; stopping means operated by said operating member when the same reaches said operative position thereof and in turn, when thus operated, stopping said driving mechanism for moving the movable member along the predetermined path thereof; means for slowing down the speed of movement of said movable member driven by said driving mechanism; first actuating means mounted on said movable member and movable between an operative position actuating said means for slowing down and an inoperative position out of engagement with said means for slowing down the speed of movement of said movable member; and second actuating means on said operating member arranged so as to be engaged by said first actuating means shortly before said movable member reaches the predetermined point of said path, said engagement permitting said first actuating means to move from inoperative into operative position so as to slow down movement of said movable member and resulting also in movement of said operating member from inoperative into operative position in which latter position it operates said stopping means stopping the driving mechanism for moving the movable member and thus also stopping the slowed down movement thereof.

2. In an arrangement including a member movable along a predetermined path and a driving mechanism for moving said movable member along said predetermined path, means for terminating movement of said movable member at a predetermined point of said path comprising, in combination, an operating member arranged alongside the path of the movable member movable in direction of the same between inoperative and operative position; stopping means operated by said operating member when the same reaches said operative position thereof and in turn, when thus operated stopping said driving mechanism for moving the movable member along the predetermined path thereof; means for slowing down the speed of movement of said movable member driven by said driving mechanism; interlocking means mounted on said movable member and movable between an operative position actuating said means for slowing down and an inoperative position out of engagement with said means for slowing down the speed of movement of said movable member; and notches in said operative member arranged so as to be engaged by said interlocking member shortly before said movable member reaches the predetermined point of said path, said engagement permitting said interlocking means to move from inoperative into operative position so as to slow down movement of said movable member and resulting also in movement of said operating member from inoperative into operative position in which latter position it operates said stopping means stopping the driving mechanism for moving the movable member and thus also stopping the slowed down movement thereof.

3. In an arrangement including a member movable along a predetermined path and a driving mechanism for moving said movable member along said predetermined path, means for terminating movement of said movable member at a predetermined point of said path comprising, in combination, a first operating member arranged alongside the path of the movable member movable in direction of the same between inoperative and operative position; stopping means operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism; interlocking means mounted on said movable member and movable between an operative position actuating said means for slowing down and an inoperative position out of engagement with said means for slowing down the speed of movement of said movable member; first notches in said first operative member arranged so as to be engaged by said interlocking member shortly before said movable member reaches the predetermined point of said path, said engagement permitting said interlocking means to move from inoperative into operative position so as to slow down movement of said movable member from inoperative into operative position in which latter position it operates said stopping means stopping the driving mechanism for moving the movable member and thus also stopping the slowed down movement thereof; and second notches in said second operative member arranged substantially in alignment, respectively, with said first notches in said first operative member and being engaged by said interlocking means so that said movable member and said operating members connected thereto by said interlocking means carry out a motion as a unit.

4. In an arrangement including a member movable along a predetermined path and a driving mechanism for moving said movable member along said predetermined path, means for terminating movement of said movable member at a predetermined point of said path comprising, in combination, a first operating member arranged alongside the path of the movable member movable in direction of the same between inoperative and operative position; stopping means operated by said first operating member when the same reaches said operative position thereof and in return, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism; interlocking means mounted on said movable member and having two lugs, said interlocking means being movable between an operative position actuating said means for slowing down and an inoperative postion out of engagement with said means for slowing down the speed of movement of said movable member; first notches in said first operative member arranged so as to be engaged by one of said lugs of said interlocking member shortly before said movable member reaches the predetermined point of said path; and second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member from inoperative into operative position in which latter position it operates said stopping means stopping the driving mechanism for moving the movable member and thus also stopping the slowed down movement thereof.

5. In an arrangement including a member movable along a predetermined path and a driving mechanism for moving said movable member along said predetermined path; means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; and second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof.

6. In an arrangement including a member movable along a predetermined path and a driving mechanism for moving said movable member along said predetermined path, means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof; and a device arranged on said rotatable shaft for adjusting the sensitivity of an apparatus connected to the arrangement.

7. In an arrangement including a member movable along a predetermined path and a driving mechanism for moving said movable member along said predetermined path, means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; second notches in said second operative member arranged respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof; and a device arranged on said rotatable shaft for adjusting the sensitivity of an apparatus connected to the arrangement, said sensitivity adjusting device including a contact arm arranged on said rotatable shaft and a plurality of stationary contacts corresponding to different sensitivities of the apparatus.

8. In an arrangement including a member movable along a predetermined path and a driving mechanism for moving said movable member along said predetermined path, means for terminating movement of said movable member at a predetermined point of said path comprising, in combination, an operating member arranged alongside the path of the movable member movable in direction of the same between inoperative and operative position; stopping means including electrical contacts operated by said operating member when the same reaches said operative position thereof and in turn, when thus operated, stopping said driving mechanism for moving the movable member along the predetermined path thereof; means for slowing down the speed of movement of said movable member driven by said driving mechanism; first actuating means mounted on said movable member and movable between an operative position actuating said means for slowing down and an inoperative position out of engagement with said means for slowing down the speed of movement of said movable member; and second actuating means on said operating member arranged so as to be engaged by said first actuating means shortly before said movable member reaches the predetermined point of said path, said engagement permitting said first actuating means to move from inoperative into operative position so as to slow down movement of said movable member and resulting also in movement of said operating member from inoperative into operative position in which latter position it operates said stopping means stopping the driving mechanism for moving the movable member and thus also stopping the slowed down movement thereof.

9. In an arrangement including a member movable along a predetermined path and a driving mechanism for moving said movable member along said predetermined path, means for terminating movement of said movable member at a predetermined point of said path comprising, in combination, an operating member arranged alongside the path of the movable member movable in direction of the same between inoperative and operative position; stopping means including electrical contacts operated by said operating member when the same reaches said operative position thereof and in turn, when thus operated stopping said driving mechanism for moving the movable member along the predetermined path thereof; means for slowing down the speed of movement of said movable member driven by said driving mechanism; interlocking means mounted on said movable member and movable between an operative position actuating said means for slowing down and an inoperative position out of engagement with said means for slowing down the speed of movement of said movable member; and notches in said operative member arranged so as to be engaged by said interlocking member shortly before said movable member reaches the predetermined point of said path, said engagement permitting said interlocking means to move from inoperative into operative position so as to slow down movement of said movable member and resulting also in movement of said operating member from inoperative into operative position in which latter position it operates said stopping means stopping the driving mechanism for moving the movable member and thus also stopping the slowed down movement thereof.

10. In an arrangement including a member movable along a predetermined path and a driving mechanism for moving said movable member along said predetermined path means for terminating movement of said movable member at a predetermined point of said path comprising, in combination, a first operating member arranged alongside the path, of the movable member movable in direction of the same between inoperative and operative position; stopping means including electrical contacts operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism; interlocking means mounted on said movable member and movable between an operative position actuating said means for slowing down and an inoperative position out of engagement with said means for slowing down the speed of movement of said movable member; first notches in said first operative member arranged so as to be engaged by said interlocking member shortly before said movable member reaches the predetermined point of said path, said engagement permitting said interlocking means to move from inoperative into operative position so as to slow down movement of said movable member from inoperative into operative position in which latter position it operates said stopping means stopping the driving mechanism for moving the movable member and thus also stopping the slowed down movement thereof; and second notches in said second operative member arranged substantially in alignment, respectively, with said first notches in said first operative member and being engaged by said interlocking means so that said movable member and said operating members connected thereto by said interlocking means carry out a motion as a unit.

11. In an arrangement including a member movable along a predetermined path and a driving mechanism for moving said movable member along said predetermined path, means for terminating movement of said movable member at a predetermined point of said path comprising, in combination, a first operating member arranged alongside the path of the movable member movable in direction of the same between inoperative and operative position; stopping means including electrical contacts operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism; interlocking means mounted on said movable member and having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; and second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member from inoperative into operative position in which latter position it operates said stopping means stopping the driving mechanism for moving the movable member and thus also stopping the slowed down movement thereof.

12. In an arrangement including a member movable along a predetermined path and a driving mechanism for moving said movable member along said predetermined path, means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means including electrical contacts operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; and second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof.

13. In an arrangement including a member movable along a predetermined path and a driving mechanism for moving said movable member along said predetermined path, means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means including electrical contacts operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down the speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof; and a device arranged on said rotatable shaft for adjusting the sensitivity of an apparatus connected to the arrangement.

14. In an arrangement including a member movable along a predetermined path and a driving mechanism for moving said movable member along said predetermined path, means for terminating movement of said movable member at a predetermined point of said path comprising, in combination, a rotatable shaft supporting said movable member; a first operating member arranged alongside said rotatable shaft and the path of the movable member movable in direction of the same between inoperative and operative position; stopping means including electrical contacts operated by said first operating member when the same reaches said operative position thereof and in turn, when thus operated, stopping said driving mechanism for moving the movable member along the predetermined path thereof; a second operative member arranged alongside the path of the movable member movable in direction of the same between inoperative and operative position; means for slowing down speed of movement of said movable member driven by said driving mechanism, said slowing down means including a pair of contacts and an element actuating said contacts so as to close and open the same, said element being arranged on said rotatable shaft; interlocking means mounted on said rotatable shaft and connected to said movable member, said interlocking means having two lugs, said interlocking means being movable between an operative position actuating said means for slowing down and an inoperative position out of engagement with said means for slowing down the speed of movement of said movable member; first notches in said first operative member arranged so as to be engaged by one of said lugs of said interlocking member shortly before said movable member reaches the predetermined point of said path; second notches in said second operative member arranged, respectively, substantially in alignment with said first notches in said first operative member and being engaged by the other of said lugs of said interlocking means so that said movable member and said operative members connected thereto by said interlocking means carry out a motion as a unit, said engagement permitting said interlocking means to move from inoperative into operative position so as to slow down movement of said movable member and resulting also in movement of said first operative member into operative position in which latter position it operates said stopping means stopping the driving mechanism for moving the movable member and thus stopping the slowed down movement thereof; and a device arranged on said rotatable shaft for adjusting the sensitivity of an apparatus connected to the arrangement, said sensitivity adjusting device including a contact arm arranged on said rotatable shaft and a plurality of stationary contacts corresponding to different sensitivities of the apparatus.

References Cited in the file of this patent

UNITED STATES PATENTS

| Number | Name | Date |
|---|---|---|
| 1,530,377 | Lamberton | Mar. 17, 1925 |
| 2,102,070 | Harris | Dec. 14, 1937 |
| 2,184,157 | Jones | Dec. 19, 1939 |
| 2,221,170 | Richardson | Nov. 12, 1940 |
| 2,452,039 | Wiken et al | Oct. 26, 1948 |